United States Patent [19]
Lindsey et al.

[11] Patent Number: 5,871,228
[45] Date of Patent: Feb. 16, 1999

[54] AIRBAG MODULE WITH SIZED INFLATOR

[75] Inventors: David W. Lindsey, Ogden; Donald R. Lauritzen, Hyrum; Larry D. Rose, Layton; David J. Green, Brigham City, all of Utah

[73] Assignee: Autoliv ASP, Inc., Ogden, Utah

[21] Appl. No.: 786,602

[22] Filed: Jan. 21, 1997

[51] Int. Cl.⁶ .......................... B60R 21/20; B60R 21/26
[52] U.S. Cl. ................. 280/728.2; 280/732; 280/740
[58] Field of Search ................. 280/728.2, 732, 280/740, 736, 741, 728.1

[56] References Cited

U.S. PATENT DOCUMENTS

| | | | |
|---|---|---|---|
| 5,332,256 | 7/1994 | Lauritzen et al. | 280/728.2 |
| 5,387,009 | 2/1995 | Lauritzen et al. | 280/741 |
| 5,398,966 | 3/1995 | Hock | 280/736 |
| 5,407,223 | 4/1995 | Lauritzen et al. | 280/728.2 |
| 5,407,226 | 4/1995 | Lauritzen et al. | 280/728.1 |
| 5,409,259 | 4/1995 | Cunningham et al. | 280/741 |
| 5,431,436 | 7/1995 | Mossi et al. | 280/728.1 |
| 5,441,705 | 8/1995 | Lauritzen et al. | 422/166 |
| 5,443,286 | 8/1995 | Cunningham et al. | 280/741 |
| 5,483,896 | 1/1996 | Hock et al. | 102/530 |
| 5,498,029 | 3/1996 | Mossi et al. | 280/741 |
| 5,547,212 | 8/1996 | Dyer et al. | 280/728.2 |
| 5,547,638 | 8/1996 | Rink et al. | 422/164 |
| 5,551,724 | 9/1996 | Armstrong, III et al. | 280/737 |
| 5,566,973 | 10/1996 | Green et al. | 280/728.2 |

*Primary Examiner*—Peter C. English
*Attorney, Agent, or Firm*—Sally J. Brown

[57] ABSTRACT

Featured for use as a part of an inflatable restraint system airbag module is an elongated cylindrical airbag inflator containing a load of a gas generant material. The inflator has a size (i.e., length) selected to correspond to the size of the load of the gas generant material stored within the inflator.

1 Claim, 7 Drawing Sheets

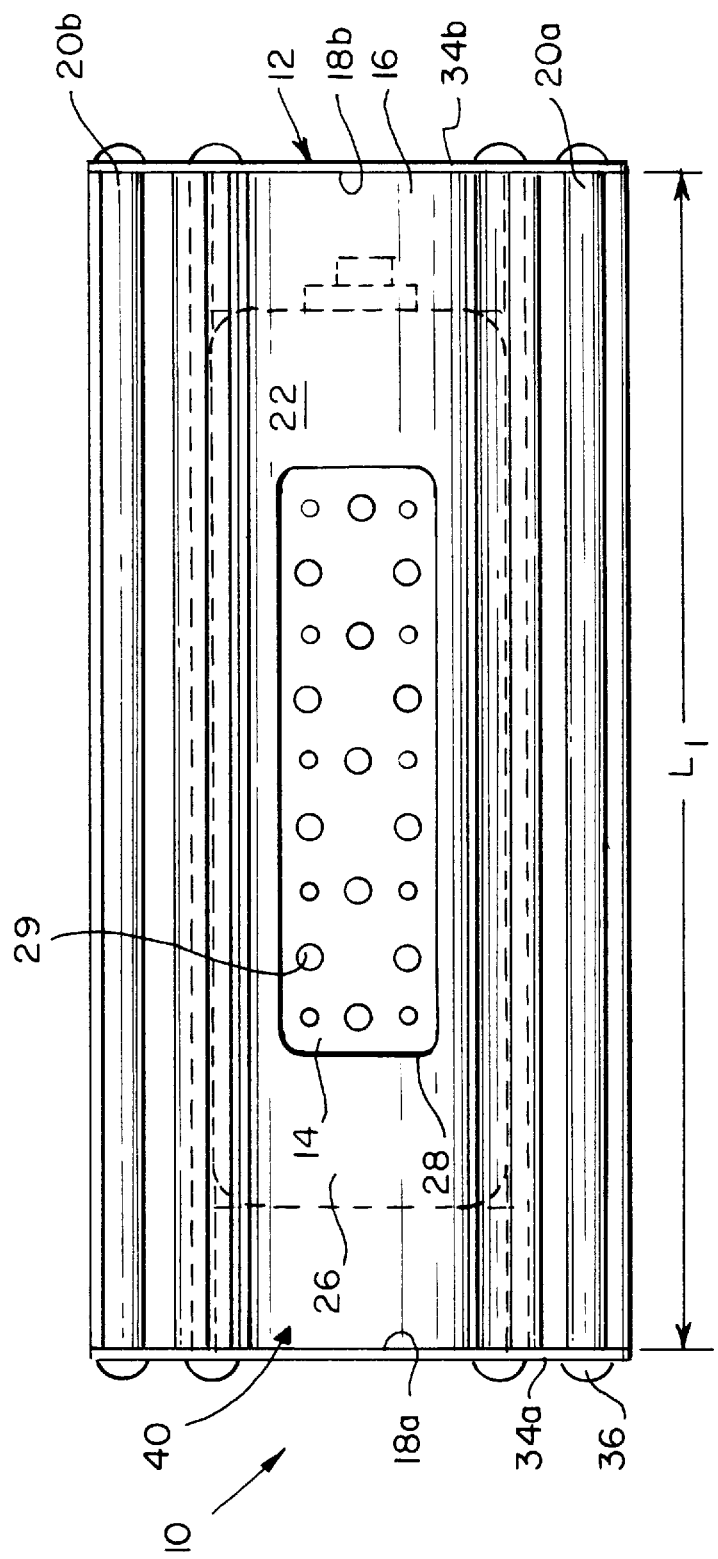

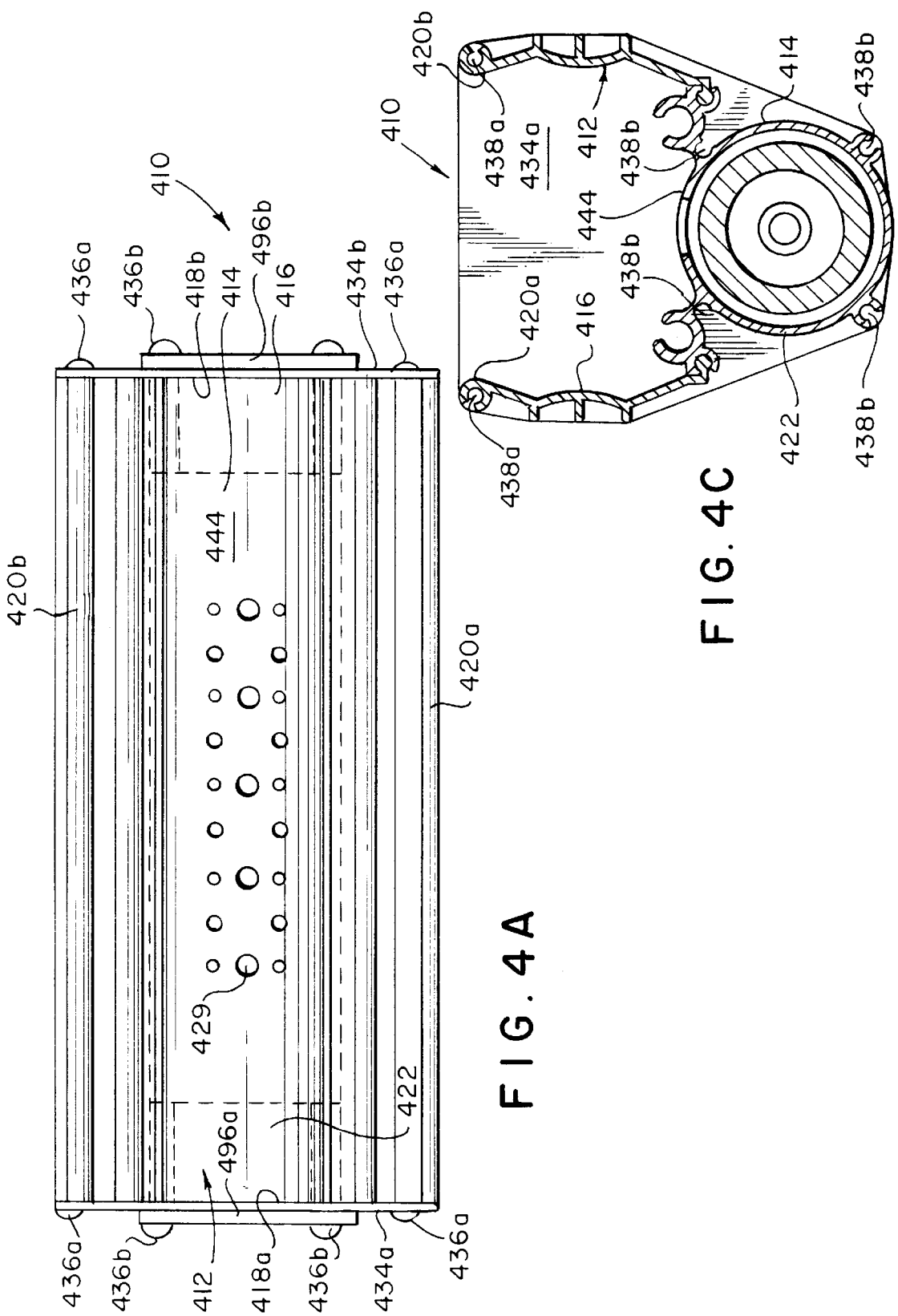

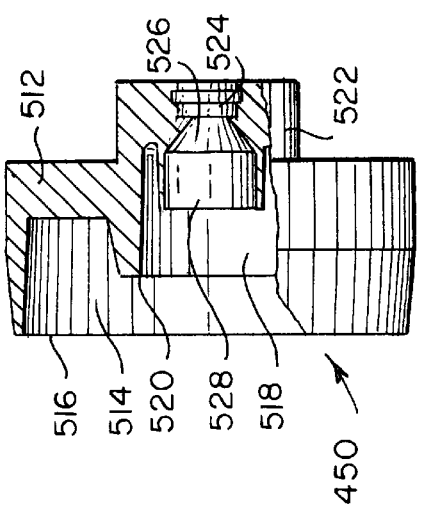
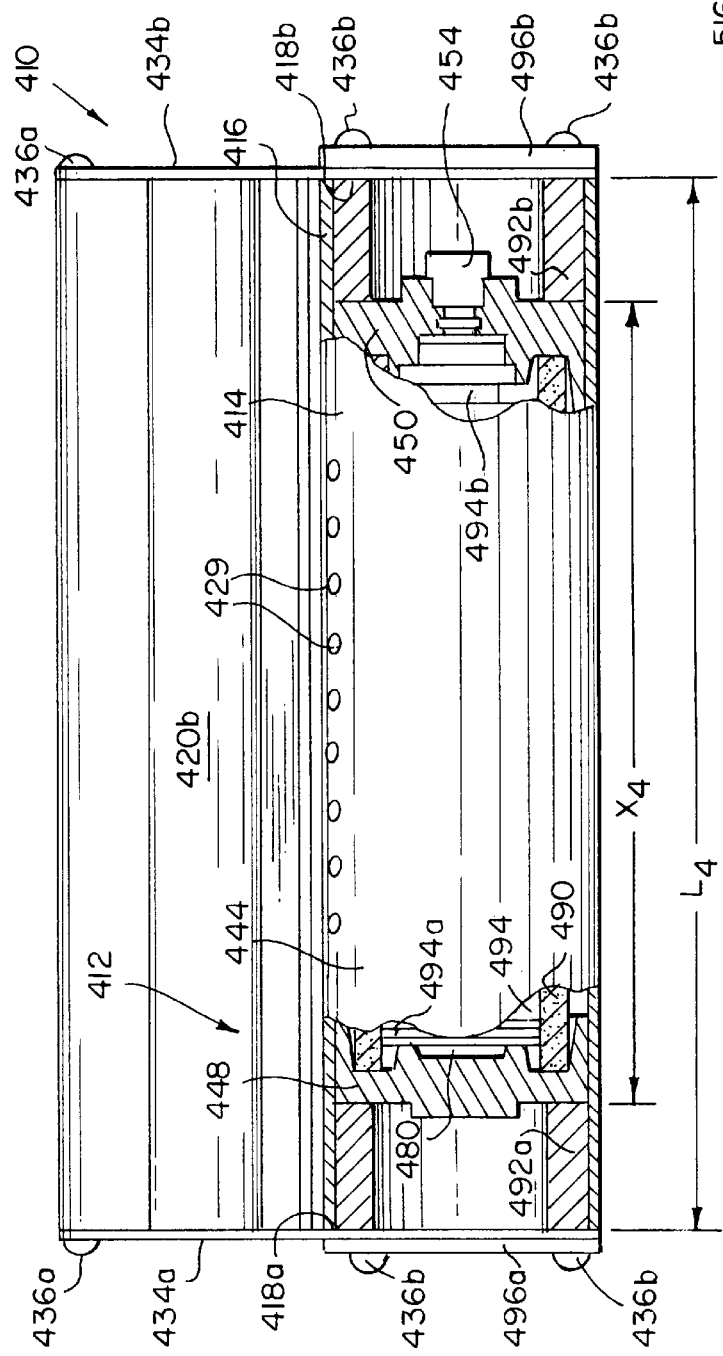
FIG. 4B
FIG. 5

AIRBAG MODULE WITH SIZED INFLATOR

BACKGROUND OF THE INVENTION

This invention relates generally to inflatable restraint systems and, more particularly, to specifically sized airbag inflators and to airbag module assemblies containing such specifically sized airbag inflators.

Airbag module assemblies generally include, as basic components: 1) an airbag cushion, which is rapidly inflated when the vehicle encounters sudden deceleration, 2) an inflator, which upon actuation serves to provide an inflation fluid, e.g., a gas, used to inflate the airbag cushion, and 3) a reaction canister, which typically functions as a structural housing supporting assembly components such as the airbag cushion and the inflator, for example, while providing a mounting base for installation of the assembly in a vehicle and serving to direct the inflation fluid resulting from the inflator.

Safety restraint airbag cushions are normally sized and shaped to provide a vehicle occupant with desired cushioning protection when one or more airbag cushions have been properly deployed. In airbag module assemblies, airbag cushions are typically stored within a reaction canister in an uninflated, folded condition. In practice, reaction canisters which contain an airbag cushion for the protection of a front seat passenger commonly have a rectangular cross sectional shape and form a correspondingly shaped opening wherethrough the airbag cushion is deployable. Normally, a passenger side airbag module assembly is mounted in or behind what is called the vehicle instrument panel or dashboard (hereinafter referred to as the "instrument panel"), with the airbag deployment opening of the reaction canister positioned planar or adjacent the instrument panel.

The size of the airbag deployment opening, e.g., the length and width of the rectangular shaped opening, are normally determined by the need to provide a particular desired airbag cushion deployment. Thus, it is common that reaction canisters have a length predetermined by the size of the inflatable airbag cushion which is to be housed therein.

In typical passenger side airbag module assemblies, the inflator has a generally hollow outer housing structure, which is generally of an elongated cylindrical shape. One type of commonly used inflator device contains a load of a gas generant material stored within such an inflator housing structure. The size of the gas generant load is generally predetermined in order to be sufficient to result in desired inflation of the associated airbag cushion upon actuation of the inflator.

In practice, such inflators are commonly sized dependent upon the shape and size of the corresponding reaction canister. For example, such inflator devices typically have a cylindrical diameter predetermined to permit the inflator to be housed within the reaction canister and a longitudinal length selected to correspond to that of the respective reaction canister. The sizing of an inflator device to correspond to the size of a corresponding reaction canister, however, can result in the inflator device outer structure having an inner volume which is larger than needed for the storage of the predetermined load of a gas generant material sufficient to result in desired inflation of the airbag cushion upon actuation of the inflator. Such extra or added volume is sometimes simply referred to as "free volume." In order to at least in part compensate for the presence of such free volume, it is common that such inflator devices include one or more variously sized and shaped internal elements, sometimes simply referred to as "spacers."

Unfortunately, the presence of free volume within an inflator structure can result in the inflator having less than optimal performance or design. For example, the presence of such free volume within an inflator structure can detrimentally increase the volume of the inflator cavity which must be pressurized in order for the inflator to achieve a proper combustion of the stored gas generant material. Additionally, as a result of such increased internal volume, an inflator may experience an undesirable delay in attaining proper combustion and may produce an effluent with a greater than desired particulate content.

Further, the presence of such unnecessary volume within an airbag module assembly component can undesirably result in the module assembly being larger than needed or desired.

Still further, larger than desired module assemblies can be more costly to manufacture, assemble and produce and may unduly or unnecessarily limit the range of module design variation and placement within a vehicle.

Thus, there is a need and a demand for an airbag module assembly which reduces, minimizes or avoids problems normally associated with the inclusion of free volume, in a relatively large amount, within an associated inflator device.

Further, there is a need and a demand for an airbag module assembly of more compact and lighter weight design.

Still further, there is a need and a demand for an airbag module assembly, particularly for the passenger side of a vehicle, having an improved design and more consistent performance.

SUMMARY OF THE INVENTION

A general object of the invention is to provide an improved airbag module assembly and inflator for use therein.

A more specific objective of the invention is to overcome one or more of the problems described above.

The general object of the invention can be attained, at least in part, through an improved airbag module assembly. The airbag module assembly includes an inflatable airbag cushion, a generally elongated cylindrical inflator which upon actuation is adapted to provide gas used to inflate the airbag cushion and a reaction canister adapted to house the inflatable airbag cushion in a stored condition. The inflator contains a predetermined load of a gas generant material stored within a gas generant material storage volume in the inflator. Upon actuation of the inflator, the load of gas generant material is sufficient to result in desired inflation of the airbag cushion. The inflator also has a generally cylindrical diameter predetermined to permit the inflator to be housed within the reaction canister. The reaction canister has a length predetermined by the size of the inflatable airbag cushion housed therein. In accordance with the invention, the inflator has a length selected to correspond to the size of the load of the gas generant material contained in the inflator.

The prior art fails to provide an elongated cylindrical gas generant-containing inflator and corresponding airbag module assembly wherein the size (i.e., length) of the inflator is selected to correspond to the size of the load of the gas generant material contained therewithin.

The invention further comprehends a specific airbag module assembly. The airbag module assembly includes a stored inflatable airbag cushion, a reaction canister adapted to house the inflatable airbag cushion in a stored condition and a generally elongated cylindrical inflator which upon actuation is adapted to provide gas used to inflate the airbag cushion.

The reaction canister has a length predetermined by the size of the inflatable airbag cushion. The inflator has a storage volume therein containing a predetermined load of a gas generant material sufficient to result in desired inflation of the airbag cushion upon actuation of the inflator. The inflator also has a generally cylindrical diameter predetermined to permit the inflator to be housed within the reaction canister. The length of the inflator is substantially less than the length of the reaction canister and is selected such that, in conjunction with the predetermined cylindrical diameter thereof, the inflator provides a storage volume corresponding to the predetermined load of the gas generant material.

The assembly also includes at least one longitudinally extending spacer element adapted to be secured to one end of the inflator and to permit the inflator to be longitudinally secured within the reaction canister.

The invention still further comprehends another specific airbag module assembly. This airbag module assembly also includes a stored inflatable airbag cushion, a reaction canister adapted to house the inflatable airbag cushion in a stored condition, and a generally elongated cylindrical inflator which upon actuation is adapted to provide gas to inflate the airbag cushion. The reaction canister has first and second opposed, generally parallel ends, with the first end longitudinally spaced from the second end by a length of predetermined size to permit the inflatable airbag cushion to be housed in the reaction canister.

The inflator has a first end, an opposed second end and a storage volume therebetween containing a predetermined load of a gas generant material in a solid form and in a quantity sufficient to result in desired inflation of the airbag cushion upon actuation of the inflator. The inflator also has a generally cylindrical diameter predetermined to permit the inflator to be housed within the reaction canister.

In the module assembly, the length of the inflator is substantially less than the length of the reaction canister and is selected such that, in conjunction with the predetermined cylindrical diameter of the inflator, the inflator provides a storage volume corresponding to the predetermined load of the gas generant material.

The module assembly also includes a first longitudinally extending spacer element adapted for placement between the first end of the inflator and the first end of the reaction canister and a second longitudinally extending spacer element adapted for placement between the second end of the inflator and the second end of the reaction canister. The first and second spacer elements are adapted to permit the inflator to be longitudinally centered and secured within the reaction canister.

As used herein, the phrase "thrust neutral" refers to the production by an inflator of zero thrust when initiated. That is to say, the gas discharge openings of the inflator are so positioned that the gas is discharged in opposing directions whereby there are no resulting forces tending to cause physical movement of the inflator. Hence, the inflator will expend the energy generated thereby, generally in place.

Further, references to inflators as "directional" are to be understood to refer to the production by an inflator of a resulting directional thrust when initiated. That is to say, the gas discharge openings in the inflator are so positioned that the gas is discharged in one or more directions whereby a resulting force may occur which would tend to cause physical movement of the inflator were not some restraining mechanism incorporated into the assembly.

Additionally, references to "extrusion" and "conventional extrusion" are to be understood to delineate from impact processing. Specifically, "extrusion" as used herein generally refers to a fundamental processing operation in many industries in which a material is forced through a metal forming die, followed by cooling or hardening such as by chemical or strain hardening. In contrast, in impact processing, a part is formed in a confining die from a metal slug, usually cold, by a single stroke application of force through a punch causing the metal to flow around the punch.

Other objects and advantages will be apparent to those skilled in the art from the following detailed description taken in conjunction with the appended claims and drawings.

BRIEF DESCRIPTION OF THE DRAWINGS

FIG. 1A is a simplified top plan view of an airbag module assembly in accordance with one embodiment of the invention.

FIG. 4A is a simplified top plan view of an airbag module assembly in accordance with a third embodiment of the invention.

FIG. 4B is a simplified, partially in section, side view of the airbag module assembly of FIG. 4A.

FIG. 4C is a simplified, partially in section, end view of the airbag module assembly of FIG. 4A and FIG. 4B.

FIG. 5 is a, partially in section, side view of the initiator end base used in the airbag module assembly illustrated in FIGS. 4A–C.

DETAILED DESCRIPTION OF THE INVENTION

The present invention, as described in greater detail below, provides an improved airbag module assembly and an inflator for use in such assemblies wherein the inflator provides a storage volume corresponding to the predetermined load of the gas generant material to be stored therein.

Figures 1B, 1C:
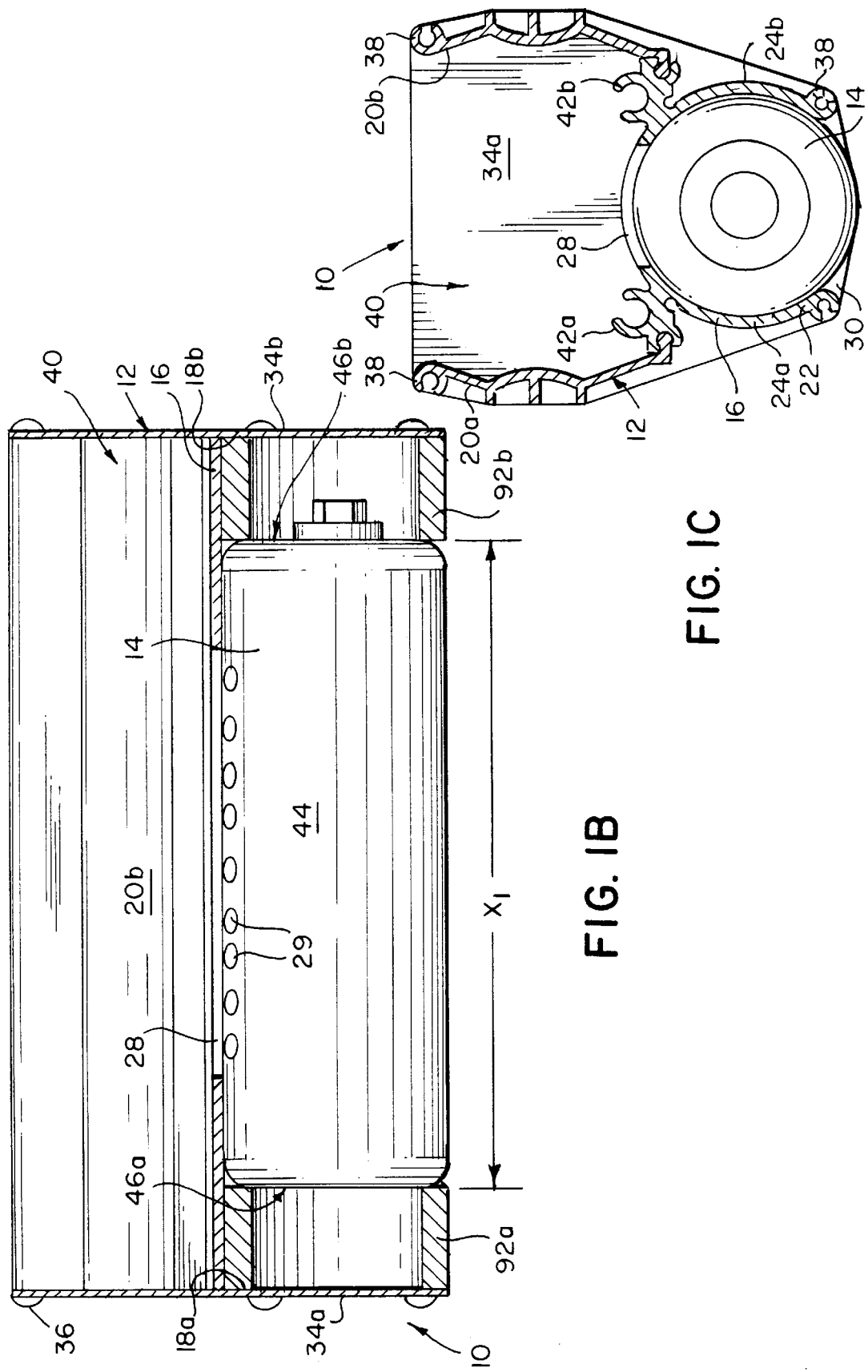
FIG. 1B is a simplified, partially in section, side view of the airbag module assembly of FIG. 1A.
FIG. 1C is a simplified, partially in section, end view of the airbag module assembly of FIG. 1A and FIG. 1B.

Referring to the drawings and initially referring particularly to FIGS. 1A–C, there is illustrated an airbag module assembly, generally designated by the reference numeral 10. It is to be understood that in the practice of the invention, such an airbag module assembly is commonly housed in or secured to any appropriate cooperating portion of the vehicle. In the case of a passenger side module installation such as herein described and illustrated, such an assembly is normally housed in the instrument panel (not shown) of the vehicle opposite the front passenger seat.

Figure 2:
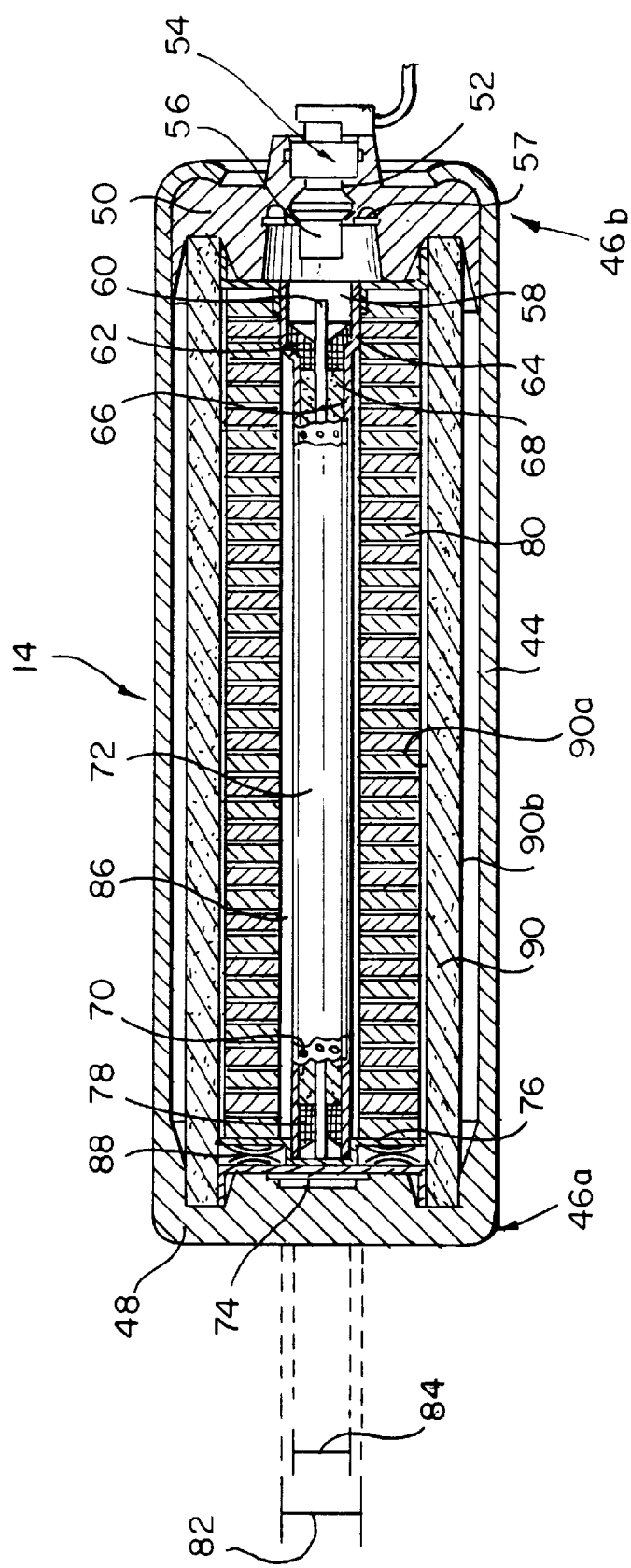
FIG. 2 is a sectional side view of the inflator of the airbag module assembly of FIGS. 1A–C.

The assembly 10 includes a reaction canister assembly 12 and an inflator 14 (shown in greater detail in FIG. 2). The reaction canister assembly 12 is an inflatable restraint system subassembly which includes a reaction canister body 16, such as specifically described in commonly assigned U.S. Pat. No. 5,407,226, Lauritzen et al., issued Apr. 18, 1995, the disclosure of which is fully incorporated herein by reference.

The reaction canister body 16 has the general form of a long, narrow, open receptacle or trough, with opposed ends 18a and 18b, respectively. The reaction canister body 16 includes first and second opposite side walls or panels, 20a and 20b, respectively. The side walls 20a and 20b are joined together by a central portion 22 having the form of an inflator holder. The central portion inflator holder 22 is of partial, generally circular cross section and includes, preferably as a part of an integral one piece extruded structure, first and second side wall portions, 24a and 24b, respectively, joined together by way of a diffuser portion 26.

In general, such a diffuser portion 26 bridges an arc of at least 30°, preferably an arc of at least about 45°, more preferably an arc of at least about 90°, and generally even more preferably an arc of at least about 120°, between the inflator holder side walls 24a and 24b, respectively, so as to provide sufficient width to the diffuser portion to properly interface between the inflator 14 and an associated airbag cushion.

The diffuser portion 26 includes a clearance hole 28 wherethrough inflation gas discharged from the outlet ports 29 of the inflator 14 can be passed to the associated airbag cushion.

While the illustrated reaction canister body 16 is formed by joining separate side walls 20a and 20b to a central body portion 22, it is to be understood that such a reaction canister body can, if desired and as described in above-referenced U.S. Pat. No. 5,407,226, be formed as a one piece construction such as by means of extrusion of a light weight material such as a relatively light weight metal such as aluminum or magnesium, for example.

As described in U.S. Pat. No. 5,407,226, as a result of practical limitations in extrusion fabrication such as those involving die-tongue ratio and various operational limitations, in practice, such extruded inflator holders generally have a circular cross section extending less than 360°. The inflator holder 22 thereby includes and defines a gap opening, generally designated by the reference numeral 30. A reaction canister body having such an extruded inflator holder of partial circular cross section will generally include a gap opening having an arc angle of at least about 45°, preferably at least about 90°, and typically no more than about 180°, preferably no more than about 135°.

It is to be appreciated that, in accordance with the invention, the reaction canister body central portion can be variously sized and shaped, as desired and need not be shaped as an inflator holder of such partial circular cross section. For example, as later described herein, such reaction canister body central portion can, if desired, be of a generally continuous circular cross sectional shape.

In the reaction canister assembly 12, a first end plate 34a is secured to the reaction canister body end 18a and a second end plate 34b is secured to the opposite reaction canister body end 18b, such as by means of fasteners 36 which are passed into corresponding attachment preparations 38 in the reaction canister body 16.

The reaction canister body side walls 20a and 20b, respectively, are generally spaced apart and in conjunction with the inflator holder 22 and the first and second end plates, 34a and 34b, respectively, define an airbag cushion storage cavity, generally designated by the reference numeral 40. (To facilitate comprehension, the drawings have been simplified by not showing the airbag cushion which, in the static state, is normally stored within storage cavity 40.)

The reaction canister body 16 also includes attachment sleeves 42a and 42b, respectively, whereby an airbag cushion can be secured in the assembly 10, such as in a manner known in the art as disclosed in commonly assigned U.S. Pat. No. 5,431,436, Mossi et al., issued Jul. 11, 1995.

In FIGS. 1A–C, the spaced apart side walls 20a and 20b are shown as generally parallel to each other. Such generally parallel oppositely disposed walls can ensure a more uniformly shaped airbag cushion storage cavity and thereby reduce the possibility that an airbag cushion housed within the cavity will undesirably get caught or snagged, such as by a protruding surface or edge of the reaction canister body. It is to be understood, however, that the side walls can be otherwise angularly positioned relative to one another as may be desired in specific applications, such as to permit the accommodation of the reaction canister into a specifically shaped instrument panel opening.

The inflator holder 22 of the reaction canister body 16 is generally sized, shaped, and adapted for the placement therein of the inflatable restraint system inflator 14.

Turning to FIG. 2, there is illustrated the inflator 14 in cross sectional view. The inflator 14 includes a cylindrical outer housing 44, such as formed of a strong lightweight material, such as aluminum. The inflator outer housing 44 has first and second ends, 46a and 46b, respectively. The inflator housing first end 46a is enclosed by an integral circular end wall 48. A separate cap member 50 is provided at the opposite end 46b and is secured in place, such as by means of swaged, crimped or welded attachment, after all of the internal components of the inflator 14 are in place within the housing 44. The end cap 50 is provided with a central aperture 52 in order to accommodate an ignition assembly 54 which includes an initiator 56 seated within the aperture 52 and provided with a seal 57 to insure a gas tight seal. An inner end 58 of the ignition assembly 54 includes a fuse-like element 60 which projects through an end screen 62 mounted in an end portion 64 of a hollow igniter tube 66.

The igniter tube 66, such as made of steel, is generally coaxially aligned along the center axis of the inflator housing 44 and contains a charge of igniter granules 68, such as granules of $BKNO_3$. The igniter tube 66 includes a plurality of perforated openings 70 and is enclosed with a covering 72, such as a wrap of aluminum foil, adapted to retain the igniter granules 68 in place. It will be appreciated that such a covering 72 can appropriately be easily ruptured to permit expanding hot gases to move out of the igniter tube 66, through the openings 70, when ignition takes place.

At the closed end wall 48 of the housing 44, there is provided an internal autoignition cup 74. A cup-like boot screen assembly 76 is provided to help maintain the adjacent end of the igniter tube 66 in concentric alignment within the inflator housing 44 and to help retain the igniter granules 68. A screen 78 is located between the boot 76 and the igniter tube 66 to allow passage of ignition products from the autoiginition cup 74 to the igniter granules 68.

The inflator housing 44 contains a load of a solid gas generant material in the form of a plurality of washer-like shaped gas generant wafers 80. As is known, such gas generant wafers 80 can be formed of sodium azide materials. The wafers 80 have an inner diameter 82 that is slightly larger than the outer diameter 84 of the covered igniter tube 66 so as to define an inner chamber or plenum 86 for initially receiving the hot gases generated upon ignition of the igniter granules 68.

Within the inflator housing 44 there also appears optional flat wire compression springs 88 or the like which permit the inflator assembly design to compensate for normal manufacturing tolerance variations.

The inflator 14 further includes a hollow, generally cylindrically shaped treatment element 90, having generally concentric inner and outer surfaces 90a and 90b, respectively. It is well known to include, a filter structure such as formed by or with wire mesh or screen, within an inflator housing. Commonly assigned U.S. Pat. No. 5,551,724, Armstrong et al., issued Sep. 3, 1996, discloses the use of a treatment element such as formed with expanded metal to treat, e.g., provide for the cooling, flow redirection and filtering (e.g., particulate removal), a particulate-containing gas within an inflator.

Returning to FIGS. 1A and 1B, the reaction canister 12 and, more specifically, the reaction canister body 16 has a length, denominated "$L_1$," predetermined based on the size of the inflatable airbag cushion housed within the reaction canister. The inflator 14, however, has a length, denominated "$X_1$," which is substantially less than the reaction canister length $L_1$. More specifically, the length X, of the inflator 14 has been selected to provide a storage volume within the inflator housing 44 corresponding to the size of the load of the gas generant material 80 stored therewithin to provide the desired inflation and deployment of the associated airbag cushion.

In contrast, with a conventional airbag module assembly, the inflator length is generally the same or substantially the same as the length of the reaction canister. As a result, the resulting inflator housing may have an internal storage volume greater than required to store the required load of gas generant material, resulting in the inflator containing free volume therewithin. As described above, the inclusion of such free volume within an inflator can have a detrimental or undesired impact on inflator and module performance and cost.

The module assembly 10 also includes a pair of simple tubular spacer elements 92a and 92b, positioned external the inflator 14, between the respective end plates 34a and 34b and the respective inflator housing ends 46a and 46b, whereby the inflator 14 can be properly restrained and positioned (e..g., the inflator outlet ports 29 properly aligned with the clearance hole 28 in the diffuser portion 26 of the reaction canister body 16).

While the invention has been described above relative to the embodiment illustrated in FIGS. 1A, 1B and 1C which included an inflator 14 having inflation gas outlet ports 29 spaced along one side of the longitudinal length of the inflator housing 44, i.e., a directional inflator, it is to be understood that the invention is not so limited.

Figure 3A:
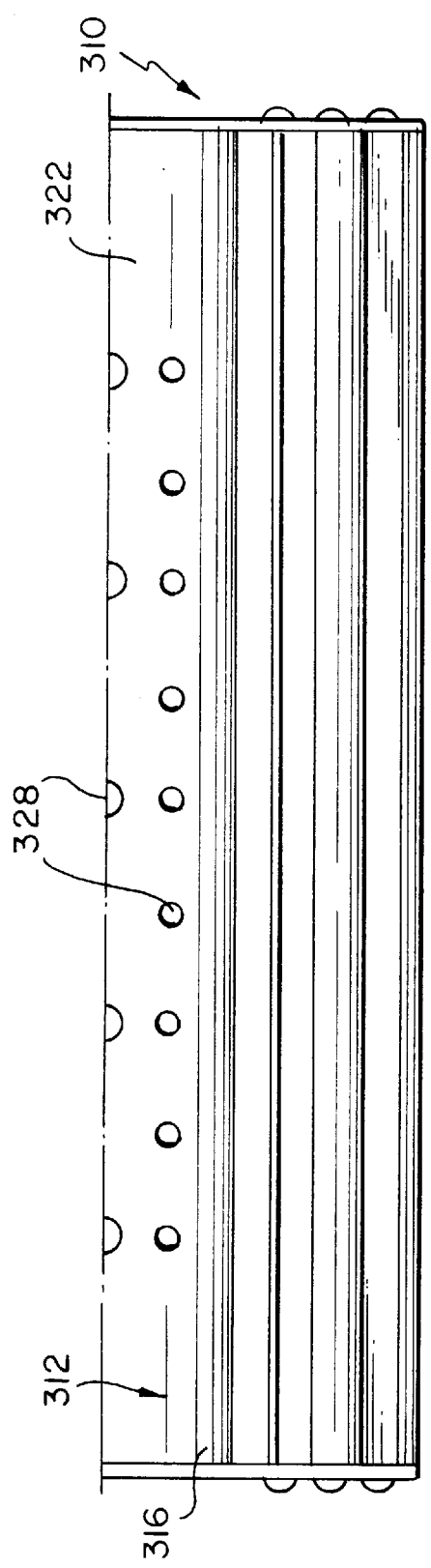
FIG. 3A is a simplified partial top plan view of an airbag module assembly in accordance with a second embodiment of the invention.
Figures 3B, 3C:
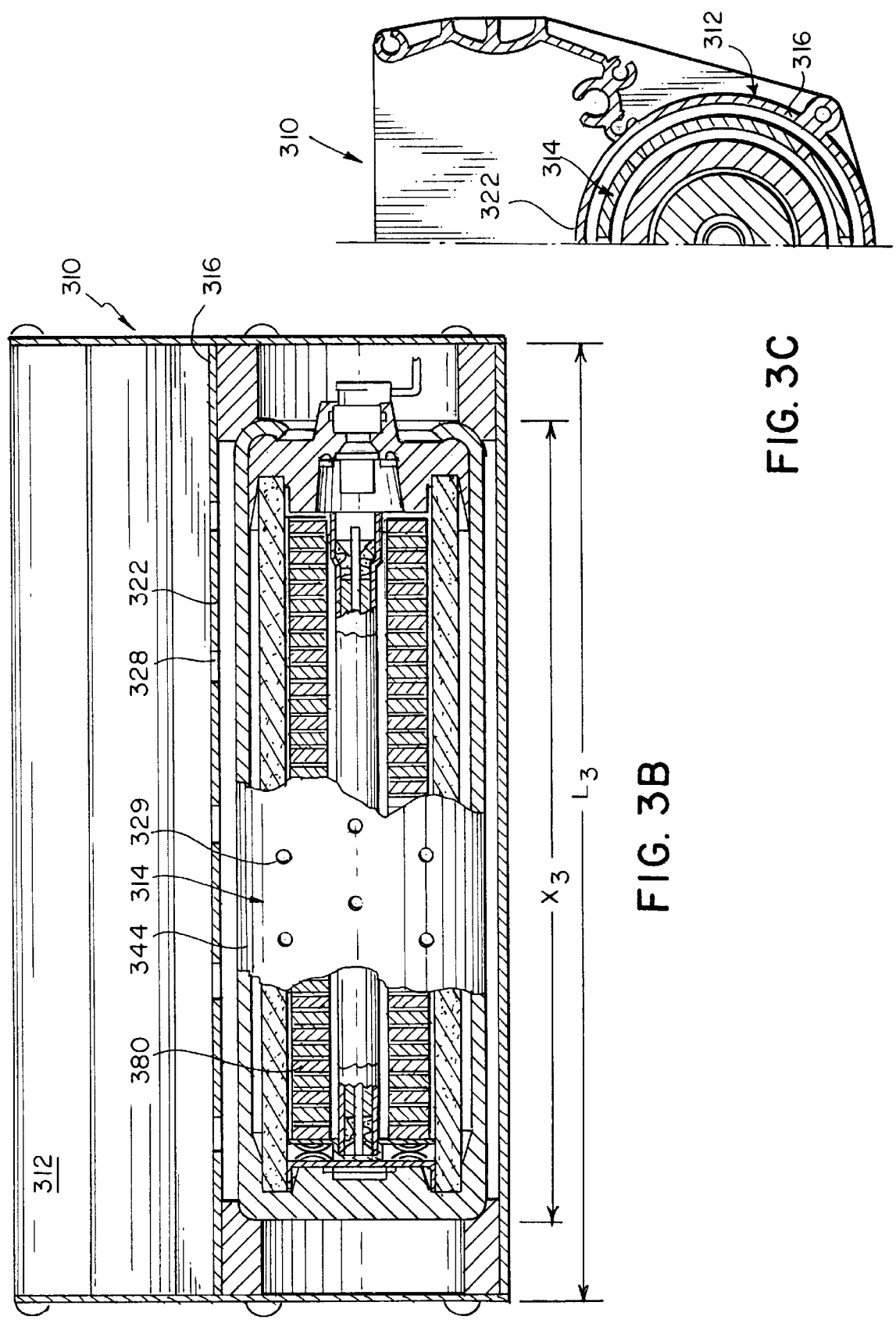
FIG. 3B is a simplified, partially in section, side view of the airbag module assembly of FIG. 3A.
FIG. 3C is a simplified, partially in section, partial end view of the airbag module assembly of FIG. 3A and FIG. 3B.

Turning to FIGS. 3A, 3B, and 3C there is illustrated an airbag module assembly, generally designated 310, in accordance with another embodiment of the invention. The airbag module assembly 310, similar to the airbag module 10 described above, includes a reaction canister assembly 312 and an inflator 314. In the assembly 310, however, the inflator 314 is a thrust neutral inflator having inflation gas outlet ports 329 generally equally spaced about the entire periphery of the elongated cylindrical inflator housing 344.

In view of the inflator 314 having the outlet ports 329 so arranged, the reaction canister 312 includes a reaction canister body 316 having a central portion 322 in the form of a generally continuous circular cross sectional shape diffuser with diffuser ports 328 appropriately arranged and positioned. Such a continuous circumference diffuser reaction canister is described and shown in commonly assigned U.S. Pat. No. 5,332,256, Lauritzen et al., issued Jul. 26, 1994, the disclosure of which is fully incorporated herein by reference.

In the assembly 310, the reaction canister 312 and, more specifically, the reaction canister body 316 has a length, denominated "$L_3$," predetermined based on the size of the inflatable airbag cushion to be housed within the reaction canister, and the inflator 314 has a length, denominated "$X_3$."

As with the above-described assembly 10, the inflator length $X_3$ is substantially less than the reaction canister length $L_3$. More specifically, the inflator length $X_3$ has been selected to provide a storage volume within the inflator housing 344 corresponding to the size of the load of the gas generant material 380 stored therewithin to provide the desired inflation and deployment of the associated airbag cushion, without the presence or inclusion of free volume in a greater than may be preferred amount.

Turning to FIGS. 4A, 4B, and 4C, there is illustrated an airbag module assembly, generally designated 410, in accordance with yet another embodiment of the invention. The airbag module assembly 410 is similar to that shown in the commonly assigned U.S. patents: U.S. Pat. No. 5,387,009, Lauritzen et al., issued Feb. 7, 1995 and U.S. Pat. No. 5,441,705, Lauritzen et al., issued Aug. 15, 1995, the disclosures of which patents are fully incorporated herein by reference and includes a reaction canister assembly 412 with a slide-together type inflator 414. More specifically, the module assembly 410 includes a combined reaction canister body 416 and a cylindrical inflator outer housing 444, with inflator outlet ports 429.

As in the module assembly 10 described above, the reaction canister body 416 has opposed ends 418a and 418b, respectively, and the general form of a long, narrow, open receptacle or trough. The reaction canister body 416 includes first and second opposite side walls or panels, 420a and 420b, respectively. The side walls 420a and 420b are joined together by a central portion 422 of generally circular cross section and which forms the cylindrical inflator outer housing 444.

The inflator 414 includes an initiator end base 450 of the type described in the above-referenced U.S. Pat. No. 5,387,009. The end base 450 is shown in greater detail in FIG. 5. The end base 450 is basically cup-shaped and includes a circular main body 512 surrounded by an outer wall 514 which has the form of an annular wedge and tapers to a narrow rim 516. Extending from the body 512 and concentric with the outer wall 514 is a shorter inner wall 518 which tapers to a relatively thicker rim 520. A cylindrical boss 522 protrudes from the opposite side of the body 512 and defines a multi-diametered opening 524 terminating in a conical seat 526 surrounded by a relatively thin cylindrical retainer 528.

A conventional ignition assembly 454, such as similar to the ignition assembly 54 described above, is accordingly mounted to the inflator 414 in and through the initiator end base 450.

The inflator 414 also contains an inflator pack 494. The inflator pack 494 comprises a hollow cylindrical treatment element 490 in the form of an annular mesh screen filter which contains a gas generant 480. The gas generant can take any number of forms. For example, as illustrated in U.S. Pat. No. 5,387,009, the gas generant charge can take the form of a stack of pyrotechnic washer-like disks separated by screen washers to provide gas paths to the inflator outlet ports.

The assembled initiator end base 450 is press fitted onto inflator pack end 494G. The tapered outer wall 514 centers and compresses the end of the mesh screen treatment element 490 and the initiator end base inner wall rim 520 presses against the generant charge.

The opposite inflator pack end 494a is closed by an end base 448. The end base 448 is similar to the initiator end base 450 but does not include means for housing and retaining an initiator.

An assembly of the inflator pack 494 and the end bases 450 and 448 is inserted within the inflator outer housing 444. Tubular spacers 492a and 492b are then placed externally adjacent the end bases 448 and 450, respectively, to occupy the balance of the length of the inflator housing 444 not required as a part of the inflator 414.

The end plates 434a and 434b, respectively, are then each secured to an opposite end of the reaction canister body 416 in part by means of fasteners 436a which extend into first reaction canister body attachment preparations 438a. Finally, retaining plates 496a and 496b, respectively, are mounted externally adjacent the end plates 434a and 434b using the fasteners 436b, which also extend through the end plates 434a and 434b, respectively, and into second reaction canister body attachment preparations 438b, thereby more completely securing such end plates to the reaction canister body 416.

In the assembly 410, the reaction canister 412 and, more specifically, the reaction canister body 416 has a length, denominated "$L_4$," predetermined based on the size of the inflatable airbag cushion to be housed within the reaction canister, and the inflator 414 has a length, denominated "$X_4$."

As with the above-described assembly 10, the inflator length $X_4$ is substantially less than the reaction canister length $L_4$. More specifically, the inflator length $X_4$ has been selected to provide a storage volume within the inflator housing 444 corresponding to the size of the load of the gas generant material 480 stored therewithin to provide the desired inflation and deployment of the associated airbag cushion.

It is to be understood that in the slide-together inflator assembly 414, as the opposed end bases 448 and 450 are appropriately movable, the length of the cylindrical inflator outer housing 444 can be predetermined and selected to result in the inflator being sized to provide a length and, in turn, a gas generant storage volume sufficient to result in desired inflation of the associated airbag cushion upon actuation of the inflator.

Thus it is to be appreciated that the invention provides an elongated cylindrical gas generant-containing inflator and corresponding airbag module assembly wherein the size (i.e., length) of the inflator is selected to correspond to the size of the load of the gas generant material contained therewithin. Such sized inflators and corresponding airbag module assemblies can thus serve to reduce, minimize or avoid problems normally associated with the inclusion of an excessive amount of free volume within an inflator device; to provide airbag module assemblies of generally more compact and lighter weight design; and to provide airbag module assemblies, particularly for the passenger side of a vehicle, having an improved design and more consistent performance.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. An airbag module assembly adapted to house an inflatable airbag cushion, said assembly comprising:

a reaction canister adapted to house the inflatable airbag cushion in a stored condition and having a length predetermined by the size of the inflatable airbag cushion; and a generally elongated cylindrical inflator which upon actuation is adapted to provide gas used to inflate the airbag cushion said inflator having a storage volume therein containing a predetermined load of a gas generant material sufficient to result in desired inflation of the airbag cushion upon actuation of said inflator, said inflator having a generally cylindrical diameter predetermnined to permit said inflator to be housed within said reaction canister;

wherein the length of said inflator is substantially less than the length of said reaction canister and is selected such that, in conjunction with the predetermined cylindrical diameter thereof, said inflator provides a storage volume corresponding to the predetermined load of the gas generant material, wherein said assembly also comprises at least one longitudinally extending spacer element adopted to be secured to one end of said inflator and to permit said inflator to be longitudinally secured within said reaction canister, and wherein said reaction canister comprises a reaction canister body having the form of an inflator holder of partial circular cross section extending less than 360°.

* * * * *